June 5, 1934.  M. H. SCHRENK  1,961,253
MULTIRANGE OSCILLATOR
Filed July 8, 1932
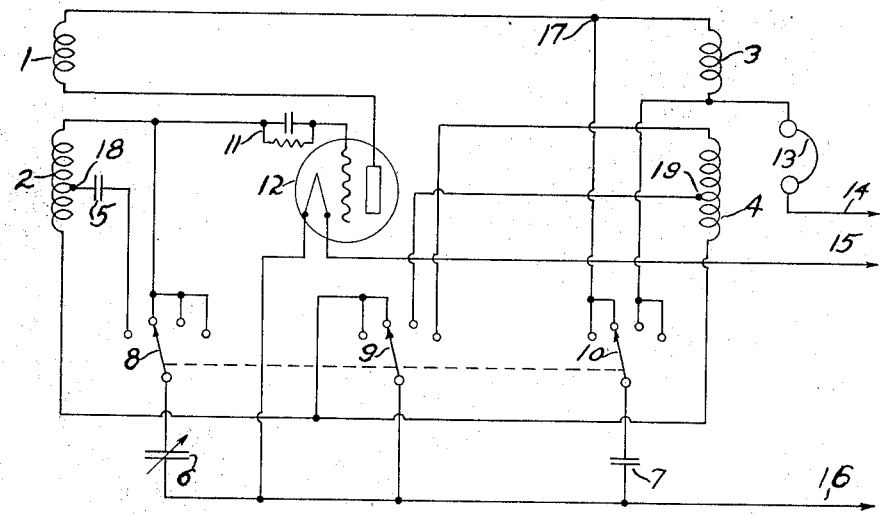
INVENTOR
Matthew H. Schrenk
BY
ATTORNEY Patented June 5, 1934

1,961,253

UNITED STATES PATENT OFFICE 1,961,253

MULTIRANGE OSCILLATOR

Matthew H. Schrenk, Washington, D. C.

Application July 8, 1932, Serial No. 621,427

3 Claims. (Cl. 250—36)

(Granted under the act of March 3, 1883, as amended April 30, 1928; 370 O. G. 757)

This invention relates to an oscillation generator employing a thermionic tube repeater, and more particularly to an oscillation generator of the feed-back type employing a frequency determining network, wherein provision is made for quickly shifting from one frequency range to another without the necessity of changing the frequency determining elements by means of plug-in apparatus.

An object of this invention is to provide a multirange oscillation generator in which effective grid circuit to plate circuit coupling is maintained for all frequencies.

Another object of this invention is to provide an oscillation generator wherein the effective inductance in the circuits may be regulated with a minimum number of switching operations.

Another object of this invention is to provide an oscillation generator in which the necessary grid circuit and plate circuit changes are made by means of a plurality of switches that are controlled by a single operation.

With the above and other objects in view, the invention consists in the construction, combination and arrangement of parts as will be described more fully hereinafter.

This invention will be more fully understood by reference to the following specification and the accompanying drawing wherein the single figure shows diagrammatically one form of the invention.

Coils 1 and 2 are in inductive relation to each other. Coils 3 and 4 are likewise in inductive relation to each other, but are not in inductive relation to coils 1 and 2. Coil 1 is connected to the plate of an electron discharge device or tube 12. Coil 2 has one terminal thereof connected to the grid of said tube by means of a suitable grid condenser and grid leak 11. The other terminal of coil 2 is connected to one terminal of coil 4, while the other terminal of coil 4 is adapted to be connected by means of the switch 9 to the filament of the tube. The coil 2, comprising the grid coil of the tube 12, is tuned by means of the variable condenser 6 which is adapted to be connected across the effective grid circuit inductance made up of all or a part of the coil 2 plus all or a part of the coil 4. The multi-point switches 8, 9 and 10 are operated simultaneously from a single control to provide a means for changing the oscillation generator from one range to another. Cathode heating current is supplied to the filament of tube 12 through leads 15 and 16, while the necessary anode potential of the tube is supplied at leads 14 and 15. A pair of phones are shown at 13 connected in series with the plate potential lead 14, coil 3, coil 1, to the plate of the tube. A fixed condenser 7 is shown connected between the filament lead 16 and switch 10. A fixed condenser 5 is shown connected to an intermediate point 18 of inductance coil 2, while the other side of the condenser 5 is adapted to be connected to switch 8. An intermediate point 19 of the coil 4 is adapted to make contact with switch 9. An intermediate point 17 between coils 1 and 3 is adapted to be connected by means of switch 10 through condenser 7 to the cathode of said tube.

The operation of the system is as follows:

With the switches 8, 9 and 10 in the first or left-hand position, the entire coil 2 is connected in the grid circuit of the tube, but the tuning condenser 6 is connected in series with fixed condenser 5 across only that portion of the coil 2 between point 18 and the cathode lead, while the plate circuit coil 1 is connected through the switch 10 and fixed condenser 7 to the cathode lead. In the second switch position, the condenser 6 is connected across the entire coil 2. The plate or tickler circuit remains the same as for the first position. In these two switch positions, coil 1 is the tickler coil and the radio frequency therein is by-passed to the filament through the condenser 7. In this case, the coil 3 acts as a radio frequency choke between the anode and the source of anode potential. In either of these first two positions, coil 4 is not used. In the third position of switches 8, 9 and 10 the grid circuit comprises all of the coil 2 and that portion of the coil 4 below point 19 which is now in series with the coil 2, the whole being connected in shunt with the tuning condenser 6. The plate circuit now comprises coils 1 and 3 and the radio frequency therein is by-passed via condenser 7 to the cathode. In this position, the coil 3 acts as an additional tickler coil in series with coil 1. This tickler being inductively coupled to coil 4 results in maintaining the proper amount of feed-back for the longer waves generated. In the fourth position of the switches, the grid circuit comprises all of coils 2 and 4 connected in series across the tuning condenser 6. The plate circuit is the same as for the third position. The phones 13 are shown connected in the output circuit. However, if it is desired to use the oscillator for a driver instead of a heterodyne receiver or frequency meter, the phones 13 may be left out and the appropriate output coupling device substituted therefor.

It will be understood that the above description and accompanying drawing comprehend only the general and preferred embodiment of my invention, and that various changes in the construction, proportion and arrangement of parts may be made within the scope of the appended claims without sacrificing any of the advantages of my invention.

The invention described herein may be manufactured and used by or for the Government of the United States of America for governmental purposes without the payment of any royalty thereon.

What I claim is:

1. A high frequency oscillation system, comprising a thermionic tube having cathode, anode and grid electrodes, input and output circuits interconnecting said electrodes, a first inductance connected to said grid, a second inductance coupled with said first inductance connected to said anode, a third inductance connected to said second inductance, a fourth inductance coupled with said third inductance connected to said first inductance, a variable condenser connected to said cathode, means for connecting a portion only or all of said first inductance across said condenser to determine certain frequency ranges, or to connect all of said first inductance in series with a portion or all of said fourth inductance across said condenser to determine still other frequency ranges, and for simultaneously connecting said second inductance alone or in series with said third inductance through a condenser to said cathode, respectively.

2. In a high frequency oscillation generator, a first pair of mutually coupled inductances, a second pair of mutually coupled inductances, a thermionic tube having cathode, anode and grid electrodes, a variable condenser connected to said cathode, a fixed condenser connected to said cathode, and switching means for connecting all or a part of the first of the inductances of the first pair in the grid cathode circuit of said tube across the variable condenser while connecting the second inductance of the first pair in the anode cathode circuit of said tube through said fixed condenser or for connecting all of the first inductance of the first pair in series with all or a part of the first inductance of the second pair in the grid cathode circuit of said tube across the variable condenser while connecting the second inductances of the first and second pair in the anode cathode circuit of said tube through said fixed condenser, whereby said oscillation generator may be made to cover a broad range of frequencies.

3. In a multi-range oscillation generator, a thermionic tube having cathode, anode and grid electrodes, a source of cathode potential connected to energize said cathode, a source of anode potential, a pair of mutually coupled inductances one terminal of the first of which is connected to said grid, a second pair of mutually coupled inductances one terminal of the first of which is connected to the other terminal of the inductance connected to the grid, means for connecting the second inductances of both pair in series with the source of anode potential in the anode cathode circuit, a variable condenser having one terminal thereof connected to the cathode for tuning the grid circuit of said tube, a fixed condenser having one terminal thereof connected to the cathode for providing a radio frequency path to said anode, and switching means for selectively connecting said variable condenser across one or both of said first inductances in series while respectively connecting said fixed condenser in series with one or both of said second inductances.

MATTHEW H. SCHRENK.